Jan. 21, 1930.　　　　D. KUSEL　　　　1,744,315
CHEESE VAT
Filed July 18, 1928　　　2 Sheets-Sheet 1

Inventor
Daniel Kusel.
By Lacey & Lacey, Attorneys

Jan. 21, 1930.  D. KUSEL  1,744,315
CHEESE VAT
Filed July 18, 1928  2 Sheets-Sheet 2

Inventor
Daniel Kusel.
By Lacey & Lacey, Attorneys

Patented Jan. 21, 1930

1,744,315

UNITED STATES PATENT OFFICE

DANIEL KUSEL, OF WATERTOWN, WISCONSIN

CHEESE VAT

Application filed July 18, 1928. Serial No. 293,522.

The purpose of this invention is the provision of a vat for use in the making of cheese which is free from external projections, such as bolts, nuts and legs, which collect foreign matter, tear the clothing and add to the difficulty of keeping the vat in a sanitary condition.

The invention furthermore provides a novel structure which is braced and strengthened against stress from within and capable of sustaining the weight of the vat and contents.

While the drawing illustrates a preferred embodiment of the invention, it is to be understood that in adapting the means to meet specific needs and requirements, the design may be varied and such other changes in the minor details of the invention as claimed, without departing from the spirit thereof.

For a full understanding of the invention and the merits thereof, reference is to be had to the following description and the drawing hereto attached, in which:—

Corresponding and like parts are referred to in the following description and designated in the several views of the drawings by like reference characters.

Figure 1:
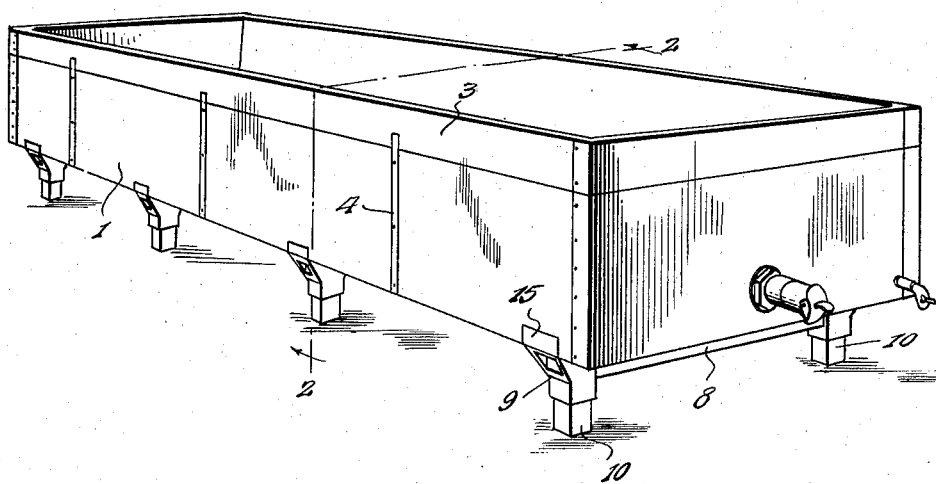
Figure 1 is a perspective view of a cheese vat embodying the invention.
Figure 4:
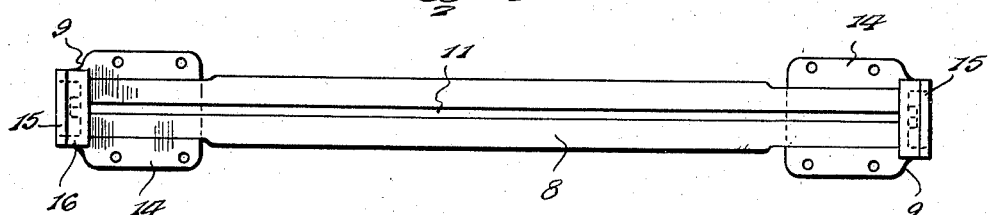
Figure 4 is a top plan view of a leg.
Figure 5:
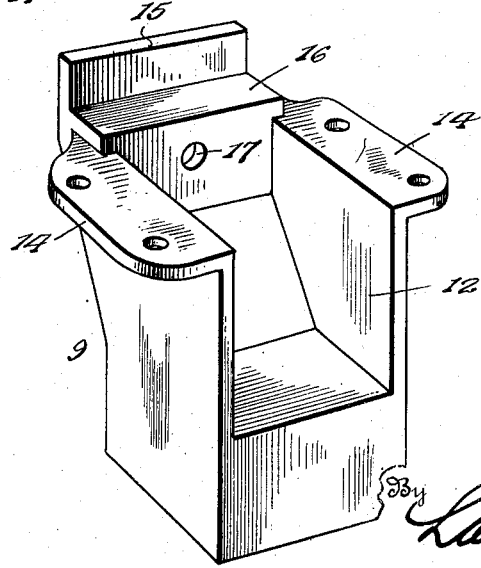
Figure 5 is an enlarged perspective view of one of the castings forming part of the leg.
Figure 2:
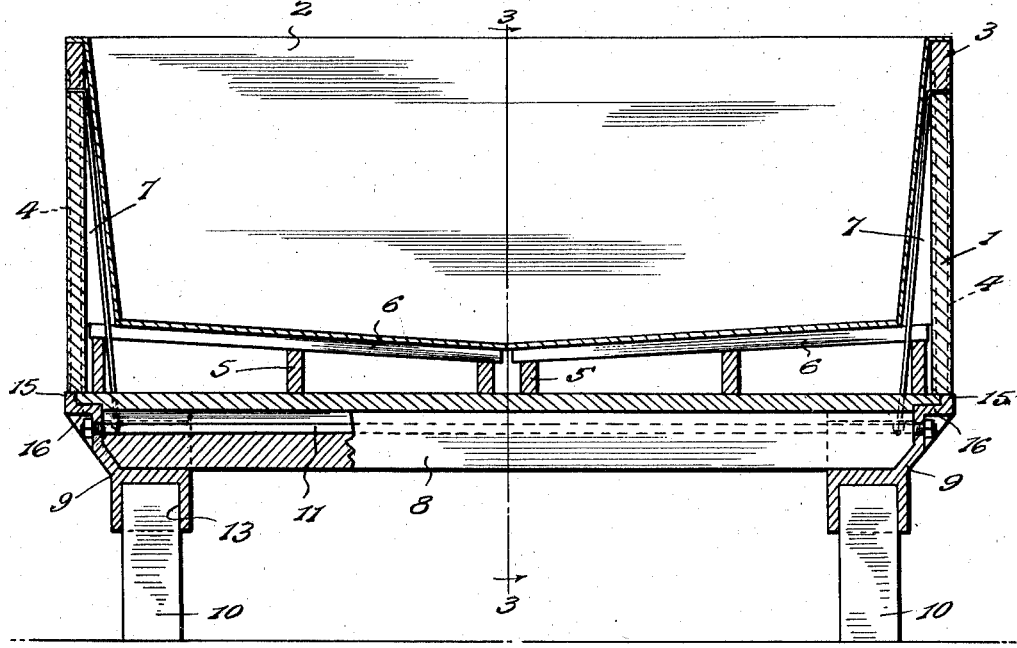
Figure 2 is an enlarged transversed sectional view of the vat on the line 2—2 of Figure 1.
Figure 3:
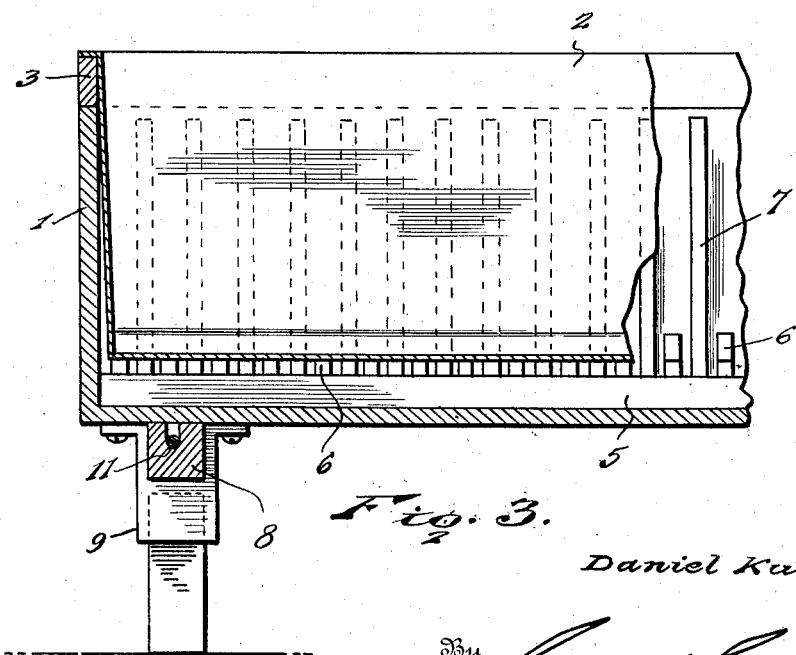
Figure 3 is a fragmentary sectional view on the line 3—3 of Figure 2.

The vat includes a body 1 which is usually of wood and received the pan 2 generally formed of sheet metal. The numeral 3 denotes a frame which is of a size to rest upon the top of the body 1 and come flush with the outer sides thereof. The top portion of the pan 2 is attached to the frame 3. The sides of the body 1 are reinforced by metal braces 4 which are disposed upon the inner and outer sides thereof as indicated most clearly in Figure 2 of the drawing. The pan 2 is mounted upon rests placed upon the bottom of the body 1 and comprising a plurality of longitudinal strips 5 and cross bars 6. The sides of the pan 2 are upwardly flared and the bottom sloped from the sides towards a medial line. Tapering strips 7 are attached to the inner faces of the sides of the body and sustain the lateral pressure against the sides of the pan and prevent any outward bulging thereof. The arrangement is such as to provide a space between the bottom and sides of the pan 2 and the corresponding parts of the body 1 for the circulation of a heating medium to maintain the contents of the pan at the required temperature.

The vat is supported at the required elevation by means of a plurality of legs. Each of the legs comprises a cross beam 8, a casting 9 at each end of the cross beam and a block 10 fitted into each of the castings. A tie rod 11 connects the castings 9 at opposite ends of the cross beam and is seated in a longitudinal channel or groove formed in the top side of the cross beam.

Each of the castings 9 is formed with a recess 12 in its top side to receive an end of the cross beam 8. A socket 13 is formed in the lower portion of the casting 9 to receive the block 10. Flanges 14 project outwardly from the castings at the top of the side walls bordering upon the recess 12 and are apertured to receive screws or other fastenings for attaching the leg to the body of the vat. The top portion of the front wall of the castings is offset outwardly, as indicated most clearly in Figure 2 of the drawings, thereby enabling the blocks 10 to be set inwardly from the sides of the vat so as to be entirely out of the way. A vertical flange 15 forms a part of the outer or front wall of each of the castings 9 and is let into the side of the body of the vat, as indicated most clearly in Figure 2 of the drawings. The upper portion of the front wall of the castings 9 adjacent the base of the flange 15 is slightly elevated above the plane of the flanges 14 and is let into the bottom of the body 1 thereby admitting of the flanges 14 touching the bottom side of the body 1 to which they are directly attached. The outer wall of each of the castings is formed with an opening 17 through which an end of the tie rod 11 projects to receive a confining nut. The blocks 10 are held within the sockets 13 by frictional engagement and are of a length to support the vat at the required elevation.

Having thus described the invention, I claim:—

1. The combination with a cheese vat having bottom portions of its sides cut away, of spaced castings secured to the bottom of the vat and recessed in their top, and having the upper front portion offset outwardly and formed with vertical flanges fitting snugly within the bottom cut away portions of the sides of the vat, and a cross beam in contact with the bottom of the vat and having its ends secured in the top recesses of the opposed castings.

2. The combination with a cheese vat having bottom portions of its sides cut away, of spaced castings secured to the bottom of the vat and recessed in their top, and having the upper front portion offset outwardly and formed with vertical flanges fitting snugly within the bottom cut away portions of the sides of the vat, a cross beam seated in the recessed tops of the castings and channeled in a side, and a tie rod in the channel and connecting the castings and clamping the cross beam therebetween.

3. The combination with a cheese vat having bottom portions of its sides cut away, of spaced castings secured to the bottom of the vat and recessed in their top, and having the upper front portion extended upwardly and offset outwardly and formed with vertical flanges fitting within the bottom cut away portions of the sides of the vat, and having lateral flanges, and formed in their lower ends with sockets, a cross beam in contact with the bottom of the vat and having its ends seated in the top recesses of the castings and formed in its top with a channel, a tie rod in the channel and connecting the opposed castings and clamping the cross beam therebetween, and blocks fitted in the sockets formed in the lower ends of the castings.

In testimony whereof I affix my signature.

DANIEL KUSEL [L. S.]